United States Patent
Yamamoto

(10) Patent No.: US 7,321,639 B2
(45) Date of Patent: Jan. 22, 2008

(54) DEMODULATOR AND ADDRESS INFORMATION EXTRACTOR

(75) Inventor: Akira Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 445 days.

(21) Appl. No.: 10/513,149

(22) PCT Filed: Jan. 26, 2004

(86) PCT No.: PCT/JP2004/000635

§ 371 (c)(1),
(2), (4) Date: Nov. 2, 2004

(87) PCT Pub. No.: WO2004/079738

PCT Pub. Date: Sep. 16, 2004

(65) Prior Publication Data

US 2005/0169404 A1    Aug. 4, 2005

(30) Foreign Application Priority Data

Mar. 7, 2003    (JP) .............................. 2003-061429

(51) Int. Cl.
*H03D 3/22* (2006.01)
(52) U.S. Cl. .................... 375/329; 369/44.13; 375/316
(58) Field of Classification Search ................ 375/329; 369/44.13
See application file for complete search history.

(56) References Cited

U.S. PATENT DOCUMENTS

| | | | | |
|---|---|---|---|---|
| 4,888,793 A | * | 12/1989 | Chanroo et al. | ............ 375/330 |
| 5,777,813 A | * | 7/1998 | Sun et al. | ...................... 360/66 |
| 6,345,018 B1 | * | 2/2002 | Maegawa et al. | ......... 369/44.13 |
| 6,452,977 B1 | * | 9/2002 | Goldston et al. | ........... 375/260 |
| 7,079,599 B2 | * | 7/2006 | Karaoguz | .................... 375/329 |
| 2002/0034266 A1 | * | 3/2002 | Akahori | ..................... 375/331 |
| 2003/0174788 A1 | * | 9/2003 | Li et al. | ..................... 375/329 |

FOREIGN PATENT DOCUMENTS

| | | |
|---|---|---|
| JP | 5-260413 | 10/1993 |
| JP | 8-214036 | 8/1996 |
| JP | 2001-126413 | 5/2001 |
| JP | 2001-209937 | 8/2001 |
| JP | 2002-74660 | 3/2002 |
| JP | 200274660 | * 3/2002 |
| JP | 2003-283747 | 9/2003 |

* cited by examiner

*Primary Examiner*—David C. Payne
*Assistant Examiner*—Leon-Viet Q Nguyen
(74) *Attorney, Agent, or Firm*—McDermott Will & Emery LLP

(57) ABSTRACT

In a demodulator for demodulating a BPSK modulated signal, demodulation performance degradation caused by analog circuits such as fabrication variation is suppressed, and furthermore, frequency variation in the BPSK modulated signal is followed by the demodulator. A multiplication circuit 105 multiplies a carrier, generated from a BPSK modulated signal by a carrier information extraction circuit 101 and a carrier generation circuit 102, by a digital BPSK modulated signal obtained by digitizing the BPSK modulated signal by an A/D converter 104 via a LPF 103. A carrier period integration circuit 106 integrates the multiplication result with respect to the period of the carrier, and the integration result is then binarized in a discriminator 107, thereby realizing demodulation.

12 Claims, 7 Drawing Sheets

DEMODULATOR AND ADDRESS INFORMATION EXTRACTOR

TECHNICAL FIELD

The present invention relates to demodulators for demodulating signals modulated using a binary phase shift keying (BPSK) method, and also relates to demodulators for extracting address information on optical disks.

BACKGROUND ART

Generally, BPSK is a method for modulating (0, 1) of data to (0, π) of the phase of a carrier, and is often used in the field of telecommunications. In recent years, this modulation technique has been also used in the field of optical disks, which are a type of recording medium. For example, this modulation scheme is used in DVD+R/+RW.

In the case of optical disks, such as DVD+R/+RW, to which data can be written, it is necessary to accurately recognize the present position of the optical pickup, that is, the present address information. These optical disks thus employ a method in which a recording track formed on the media is wobbled periodically, and in specific positions of the wobbled groove (hereinafter referred to as wobble), phase inversion is caused to occur so as to represent addresses.

When the wobble is read by the optical pickup, an analog signal having the wobble period is obtained. It is a BPSK demodulator that detects a phase from this analog signal and reproduces address information. The above-mentioned technique is disclosed for example in Japanese Laid-Open Publication Nos. 5-260413, 2001-126413, and 2001-209937.

Many conventional BPSK demodulators are composed of analog circuits as shown in FIG. 7. In FIG. 7, the reference numeral 701 denotes a carrier reproduction circuit for reproducing a carrier of a BPSK modulated signal from the BPSK modulated signal. Although not shown, the carrier reproduction circuit is often composed of a bandpass filter (hereinafter referred to as a "BPF") and a PLL circuit. The reference numeral 702 indicates a BPF for also receiving the BPSK modulated signal and then passing only the frequency band of the signal to remove noise in the transmission path. The reference numeral 703 represents a multiplier for receiving the reproduced carrier from the carrier reproduction circuit 701 and the BPSK modulated signal whose frequency band alone has been allowed to pass by the BPF 702, and then multiplying the two inputs. When the reproduced carrier and the BPF output signal are in phase with each other, an output value produced from the multiplier 703 is always a positive sine wave. When they are in opposite phase, on the other hand, the output value is always a negative sine wave. Only a low frequency band of the multiplication result produced from the multiplier 703 is allowed to pass by a lowpass filter 704 (hereinafter refereed to as a "LPF"). Theoretically, a constant positive value is output from the LPF 704 in the case where the reproduced carrier and the BPF output signal are in phase with each other, while a constant negative value is output in the case where they are in opposite phase. The reference numeral 705 denotes a discriminator for making a comparison between the output produced from the LPF 704 and 0 level. If the value obtained from the comparison is positive, the discriminator 705 outputs 1, and if the value is negative, the discriminator 705 outputs 0. The discrimination result produced from the discriminator 705 is the data before BPSK modulation.

PROBLEMS THAT THE INVENTION INTENDS TO SOLVE

However, the demodulator having the analog configuration shown in FIG. 7 is susceptible to fabrication variations in the component elements thereof, temperature changes, or aged deterioration, and its performance is likely to deteriorate. Moreover, when such an analog configuration demodulator is used as an address detector for DVD+R/+RW, the frequency characteristics of the analog filters 702 and 704 have to be changed dynamically in order to correspond to a CAV (constant angular velocity) method in which the number of rotations of the optical disk is kept constant and signal processing speed in recording/reproduction is changed with respect to the physical radius position on the optical disk. Nevertheless, it is difficult to make the filter characteristics follow the frequency changes.

DISCLOSURE OF INVENTION

The present invention solves the above problem, and an object of the present invention is to reduce fabrication variations and effects of temperature changes or aged deterioration that cause performance degradation, and to increase noise immunity using a noise filter which follows frequency changes in an input BPSK modulated signal.

In order to achieve the above object, the present invention employs a digital circuit configuration which is not easily affected by fabrication variations and noise, instead of using an analog circuit configuration which is likely to be affected by them. Specifically, in an inventive demodulator for demodulating a BPSK modulated signal, digital circuit configurations are used to cut noise in the BPSK modulated signal and in processing for reproducing a carrier from the BPSK modulated signal, and a multiplication result obtained from multiplication of the modulated signal and the carrier signal is integrated with respect to the carrier period, whereby a filter which follows frequency changes in the BPSK modulated signal and has excellent noise-removing effect is obtained.

Specifically, an inventive demodulator includes: carrier information extraction means for extracting carrier information that a BPSK modulated signal has; carrier generation means for generating a carrier based on the carrier information extracted by the carrier information extraction means; analog-to-digital conversion means for converting the BPSK modulated signal to a digital value; multiplication means for multiplying the carrier output from the carrier generation means by the BPSK modulated signal digitized by the analog-to-digital conversion means; carrier period integration means for integrating a result of the multiplication performed by the multiplication means, with respect to a period of the carrier generated by the carrier generation means; and discrimination means for binarizing a result of the integration performed by the carrier period integration means.

More specifically, the inventive demodulator further includes low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

In the inventive demodulator, the carrier generation means generates a sine wave as the carrier.

In the inventive demodulator, the carrier generation means generates a triangular wave as the carrier.

In the inventive demodulator, the carrier generation means generates, as the carrier, a modified square wave, in which if the amplitude of the modified square wave is 1 during the period of time in which the phase thereof is from 0 to $\pi/3$, the amplitude becomes 2 during the period of time in which the phase is from $\pi/3$ to $2\pi/3$, the amplitude becomes 1 during the period of time in which the phase is from $2\pi/3$ to $\pi$, the amplitude becomes $-1$ during the period of time in which the phase is from $\pi$ to $4\pi/3$, the amplitude becomes $-2$ during the period of time in which the phase is from $4\pi/3$ to $5\pi/3$, and the amplitude becomes $-1$ during the period of time in which the phase is from $5\pi/3$ to $2\pi$.

In the inventive demodulator, the carrier generation means generates a square wave as the carrier.

In the inventive demodulator, the carrier information extraction means extracts the period of the carrier as the carrier information that the BPSK modulated signal has.

The inventive demodulator further includes phase difference detection means for detecting a value corresponding to a phase difference between the carrier generated by the carrier generation means and the digital BPSK modulated signal converted by the analog-to-digital conversion means. The phase difference detection means includes: delay means for delaying the carrier generated by the carrier generation means by a given amount of time; second multiplication means for multiplying the delay carrier delayed by the delay means by the digital BPSK modulated signal converted by the analog-to-digital conversion means; second carrier period integration means for integrating a result of the multiplication performed by the second multiplication means, with respect to the period of the carrier generated by the carrier generation means; and subtraction means for performing a subtraction using the integration result produced by the carrier period integration means and the integration result produced by the second carrier period integration means. The carrier generation means receives, as a phase difference detection signal, a result of the subtraction performed by the subtraction means, and adjusts, based on the subtraction result, the phase of the carrier that the carrier generation means generates, so that the phase difference is eliminated.

An inventive address information extraction device extracts address information written on a recording medium of an optical disk. In the address information extraction device, the demodulator reproduces the address information written on the recording medium.

In the inventive demodulator, the carrier information extraction means extracts carrier information of the BPSK modulated signal digitized by the analog-to-digital conversion means.

The inventive demodulator further includes low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

In the inventive demodulator, the carrier generation means generates a sine wave as the carrier.

In the inventive demodulator, the carrier generation means generates a triangular wave as the carrier.

In the inventive demodulator, the carrier generation means generates, as the carrier, a modified square wave, in which if the amplitude of the modified square wave is 1 during the period of time in which the phase thereof is from 0 to $\pi/3$, the amplitude becomes 2 during the period of time in which the phase is from $\pi/3$ to $2\pi/3$, the amplitude becomes 1 during the period of time in which the phase is from $2\pi/3$ to $\pi$, the amplitude becomes $-1$ during the period of time in which the phase is from $\pi$ to $4\pi/3$, the amplitude becomes $-2$ during the period of time in which the phase is from $4\pi/3$ to $5\pi/3$, and the amplitude becomes $-1$ during the period of time in which the phase is from $5\pi/3$ to $2\pi$.

In the inventive demodulator, the carrier generation means generates a square wave as the carrier.

In the inventive demodulator, the information extracted by the carrier information extraction means is the period of the carrier.

The inventive demodulator further includes phase difference detection means for detecting a value corresponding to a phase difference between the carrier generated by the carrier generation means and the digital BPSK modulated signal converted by the analog-to-digital conversion means. The phase difference detection means includes: delay means for delaying the carrier generated by the carrier generation means by a given amount of time; second multiplication means for multiplying the delay carrier delayed by the delay means by the digital BPSK modulated signal converted by the analog-to-digital conversion means; second carrier period integration means for integrating a result of the multiplication performed by the second multiplication means, with respect to the period of the carrier generated by the carrier generation means; and subtraction means for performing a subtraction using the integration result produced by the carrier period integration means and the integration result produced by the second carrier period integration means. The carrier generation means receives, as a phase difference detection signal, a result of the subtraction performed by the subtraction means, and adjusts, based on the subtraction result, the phase of the carrier that the carrier generation means generates, so that the phase difference is eliminated.

An inventive address information extraction device extracts address information written on a recording medium of an optical disk. In the address information extraction device, the demodulator reproduces the address information written on the recording medium.

As described above, in the present invention the analog BPSK modulated signal is converted to a digital value using the analog-to-digital conversion means in order to digitally perform the following multiplication of the generated carrier and the digitized BPSK modulated signal and the following integration of the multiplication result with respect to the carrier period. This allows the multiplication mean and the carrier period integration means to be composed of digital circuits, thereby suppressing performance degradation.

In the present invention, the BPSK modulated signal whose high-frequency noise has been removed by the low-frequency-band passing means is input into the analog-to-digital conversion means, which enables highly accurate analog-to-digital conversion.

Furthermore, in the present invention, the integration result which is based on the delay carrier that has been delayed by a given amount of time and which is produced from the second carrier period integration means is subtracted from the integration result produced from the carrier period integration means, thereby obtaining a value which corresponds to the phase difference between the delay carrier and the BPSK modulated signal. With the value corresponding to the phase difference, the phase of the carrier that the carrier generation means generates is corrected, thereby permitting more accurate demodulation.

Moreover, in the present invention, after the noise removing process has been performed by the low-frequency-band passing means, the carrier generation means generates the carrier based on the carrier information extracted by the carrier information extraction means using the BPSK modulated signal digitized by the analog-to-digital conversion means. Therefore, the carrier information extraction means which receives the digital signal can be also composed of digital circuits, and in addition, highly accurate demodulation in which signal degradation is suppressed is achieved.

BEST MODE FOR CARRYING OUT THE INVENTION

Hereinafter, preferred embodiments of the present invention will be described with reference to the accompanying drawings.

[First Embodiment]

Figure 1:
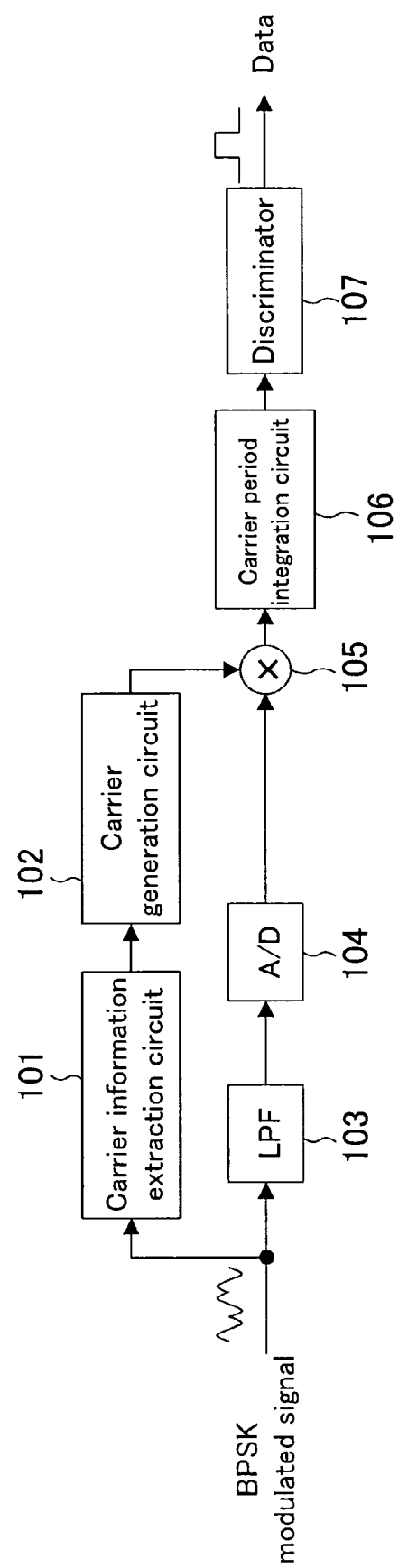
FIG. 1 is a view illustrating the configuration of a BPSK demodulation circuit according to a first embodiment of the present invention.

FIG. 1 is a block diagram of a BPSK demodulation circuit according to one embodiment.

The reference numeral 101 denotes a carrier information extraction circuit (carrier information extraction means) for extracting, as carrier information, frequency components of a carrier that an input BPSK modulated signal has. The reference numeral 102 indicates a carrier generation circuit (carrier generation means) for generating the carrier from the frequency components of the carrier extracted by the carrier information extraction circuit 101. A LPF (low-frequency-band passing means) 103 passes only a frequency band of the BPSK modulated signal that is equal to or lower than the carrier frequency band, and an A/D converter (analog-to-digital conversion means) 104 converts the analog BPSK modulated signal to a digital signal. Multiplication of the generated carrier obtained by the carrier generation circuit 102 and the digital BPSK modulated signal converted by the A/D converter 104 is performed by a multiplier (multiplication means) 105. The multiplication result is input to a carrier period integration circuit (carrier period integration means) 106. The carrier period integration circuit 106 integrates the multiplication result produced from the multiplier 105, with respect to the period of the carrier obtained by the carrier information extraction circuit 101, and inputs the integration result to a discriminator (discrimination means) 107. The discriminator 107 determines whether the value of the carrier period integration result is positive or negative, and outputs binary data. Specifically, when the value is positive, the discriminator 107 outputs 1, and when the value is negative, the discriminator 107 outputs 0. This output value is demodulation data.

Next, the detailed configuration will be described. In this embodiment, the carrier information extraction circuit 101 is composed of a bandpass filter and a PLL circuit, for example. Information that the carrier information extraction circuit 101 extracts is a square wave which is synchronous with the BPSK modulated signal. The waveform of the generated carrier output from the carrier generation circuit 102 may be various. In this embodiment, however, it is assumed that the carrier generation circuit 102 is a lowpass filter and outputs a sine wave, for example.

The sine wave generated by the carrier generation circuit 102 and the BPSK modulated signal output from the A/D converter 104 have the same frequency, but their waveforms are in phase with each other at some locations and in opposite phase in other locations. When the sine wave and the BPSK modulated signal are in phase with each other, the result of multiplication of the sine wave and the BPSK modulated signal performed by the multiplier 105 is a double frequency sine wave having amplitude only at the positive side. When they are in opposite phase, the result obtained by the multiplication is a double frequency sine wave having amplitude only at the negative side. The output produced from the multiplier 105 is integrated by the carrier period integration circuit 106 with respect to the carrier period. The operation in which the sine wave is multiplied and the multiplication result is integrated with respect to the period of that sine wave is equal to obtaining the Fourier coefficient of the sine wave using the Fourier series expansion.

As a result of this integration, a positive constant value is output when the sine wave and the BPSK modulated signal are in phase with each other. When they are in opposite phase, a negative constant value is output. Furthermore, DC components, n-fold frequency components, and cosine wave components can be completely removed from the orthogonality of the trigonometric function. That is, the operation performed by the multiplier 105 and the carrier period integration circuit 106 can be considered as a bandpass filter that passes only the carrier frequency. The carrier period integration circuit 106 outputs a positive or negative constant value. The discriminator 107 determines whether this output is positive or negative. When the output is positive, the discriminator 107 associates the output with 1. When the output is negative, the discriminator 107 associates the output with 0. In this manner, the discriminator 107 outputs the demodulation data.

Accordingly, when the phase of the BPSK modulated signal is 0, 1 is output; when the phase is $\pi$, 0 is output. In this way, a BPSK demodulation circuit is realized.

Figure 2:
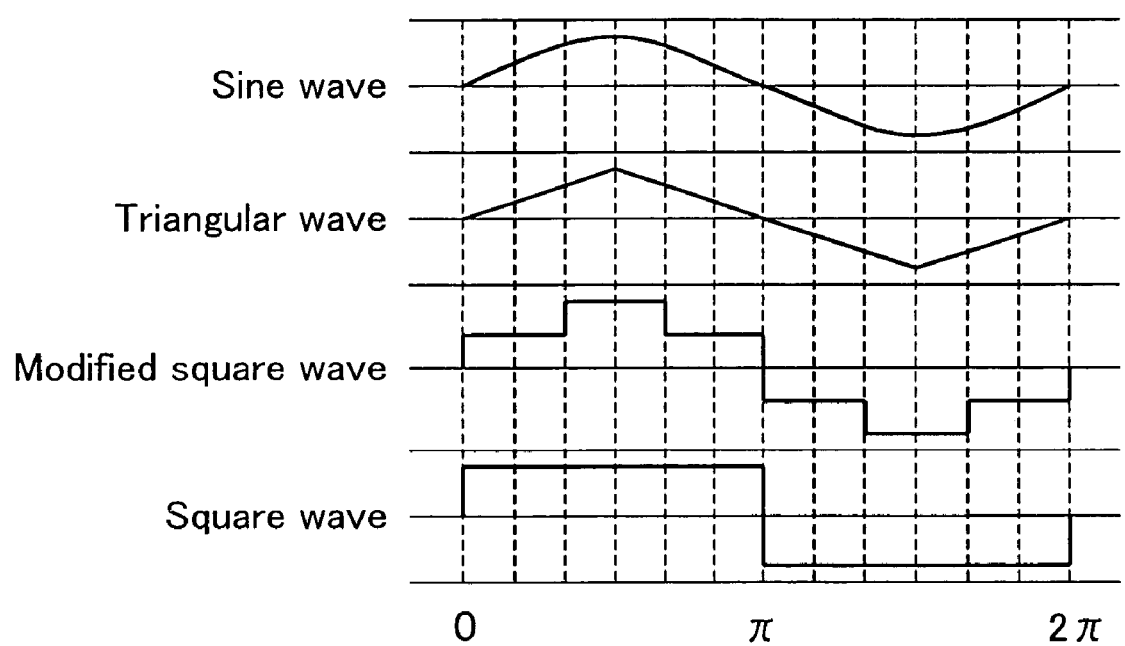
FIG. 2 illustrates various generated carriers.

Next, referring to FIG. 2, relationship between demodulation performance and circuit size, obtained in cases where the output waveform produced from the carrier generation circuit 102 is other than the sine wave, will be considered. First, an alternative waveform to the sine wave may be a triangular wave. A triangular wave may be generated from the square wave in the following manner, for example. First, the period of the square wave is measured as a period T, and it is assumed that the obtained period T takes value 0 at time 0. In this case, a triangular wave is generated by a circuit in which a constant value a is added during the period of time from the time 0 to time T/4, the constant value a is subtracted during the period of time from the time T/4 to time 3T/4, and the constant value a is added again during the period of time from the time 3T/4 to time T. Since this circuit can be formed easily using an adder and a resistor, the triangular wave can be obtained by the circuit that is simpler than the circuit necessary for generating the sine wave. Next, another alternative waveform to the sine wave may be a modified square wave. In this case, a modified square wave is generated by a circuit which, e.g., outputs a constant value b during the period of time from the time 0 to time T/6, outputs a constant value 2b during the period of time from the time T/6 to time T/3, outputs the constant value b during the period of time from the time T/3 to time T/2, outputs a constant value −b during the period of time from the time T/2 to time 2T/3, outputs a constant value −2 b during the period of time from the time 2T/3 to time 5T/6, and outputs −b during the period of time from the time 5T/6 to time T. This circuit may be formed of a constant output unit and a selector. Thus, the modified square wave can be realized by the circuit that is simpler than the circuit necessary for generating the triangular wave. Another alternative waveform to the sine wave may be a square wave. In this case, if the carrier information extraction circuit 101 outputs a square wave, that square wave may be output as it is, so the square wave is obtained by the simplest circuit.

Figure 3:
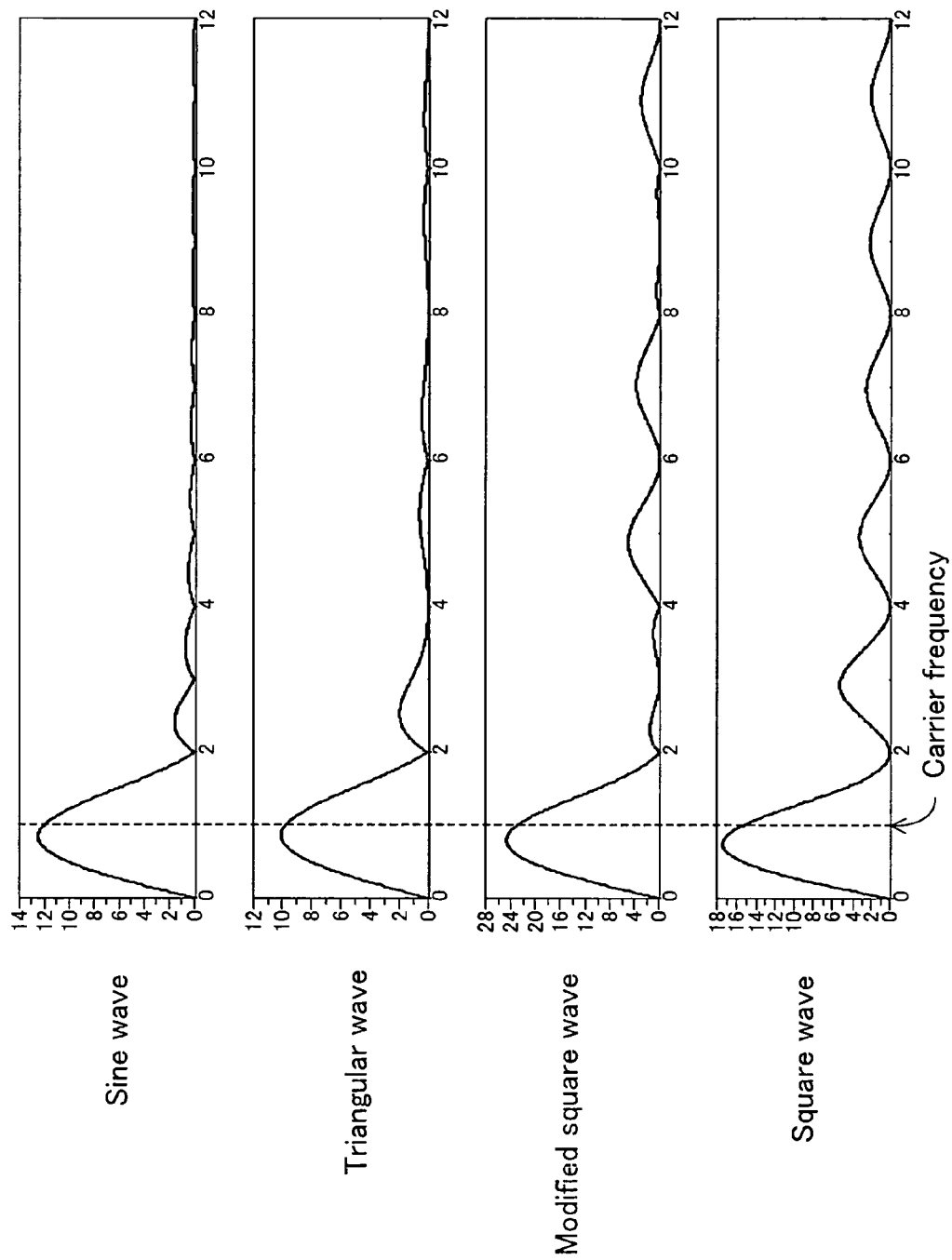
FIG. 3 illustrates frequency characteristics of the respective generated carriers.

FIG. 3 illustrates frequency characteristics of waveforms obtained through the multiplier 105 and the carrier period integration circuit 106 in cases where the generated carrier is a sine wave, a triangular wave, a modified square wave, or a square wave. First, in the case of the sine wave, frequencies close to the carrier frequency only have gain and gain in the other frequencies is substantially 0, exhibiting good bandpass characteristics. In the BPSK modulation method, information is present only in the carrier frequency. These bandpass characteristics are thus very effective in removing noise, and in addition, demodulation performance in this case is high. Next, in the case of the triangular wave, although gain remains in frequencies that are within two to three times greater than the carrier frequency, the triangular wave as a whole has bandpass characteristics. Next, in the case of the modified square wave, although gain in 3n-fold frequencies is substantially 0, gain remains in the other frequencies. In the case of the square wave, gain remains in odd-multiple frequencies.

From the above, it is found that the sine wave, the triangular wave, the modified square wave, and the square wave, in that order, have the best frequency characteristics, and that the most suitable, generated carrier waveform may be selected in accordance with a tradeoff between performance and circuit costs.

In this embodiment the output produced from the carrier information extraction circuit 101 is the square wave having the same period as that of the BPSK modulated signal. However, in order to facilitate processing performed in the carrier generation circuit 102, it is also effective to extract and output the period itself.

Furthermore, the BPSK demodulator also functions as an address information extraction device for extracting address information by reading wobble on a recording medium such as an optical disk. The BPSK demodulator may thus be used as an address information extraction device that achieves highly accurate demodulation.

[Second Embodiment]

Next, a second embodiment of the present invention will be discussed with reference to FIG. 4.

Figure 4:
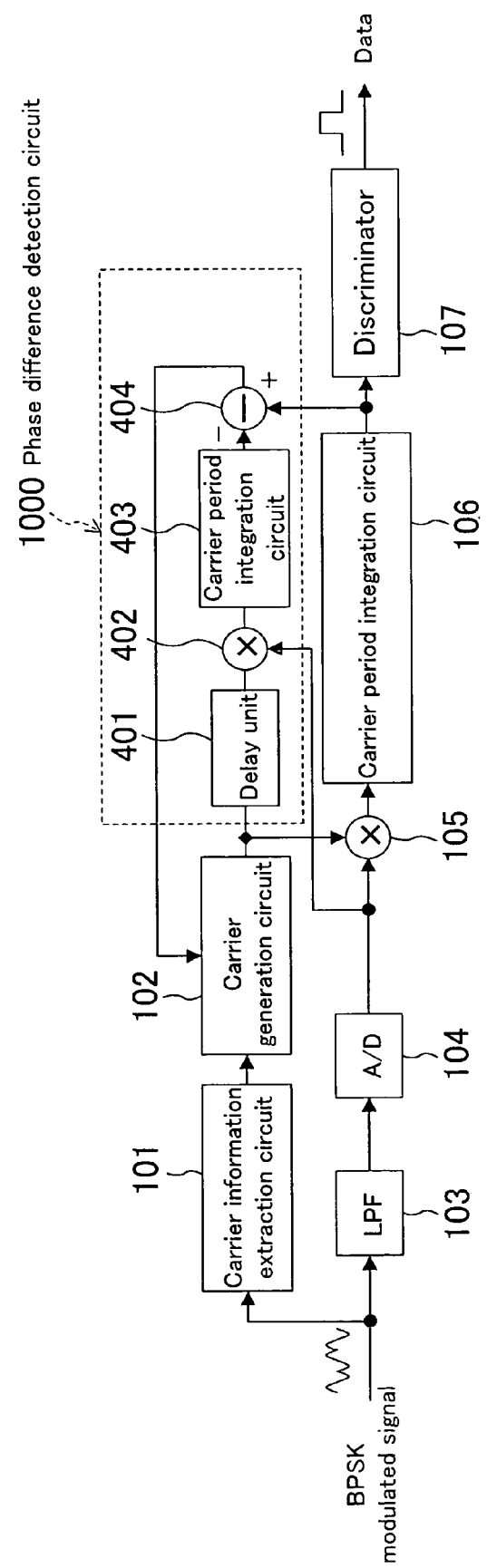
FIG. 4 is a view illustrating the configuration of a BPSK demodulation circuit according to a second embodiment of the present invention.

FIG. 4 illustrates a BPSK demodulation circuit of this embodiment.

In this embodiment, more accurate demodulation is achieved. In the first embodiment, the generated carrier obtained by the carrier generation circuit 102 and the BPSK modulated signal digitized by the A/D converter 104 are derived from the same BPSK modulated signal, but pass through the different paths. This may cause a phase shift between the generated carrier and the digitized BPSK modulated signal due to effects of delay or the like. To adaptively correct this phase shift in the demodulation process, information on the phase difference is required. In view of this, a phase difference detection circuit (phase difference detection means) 1000 is added to detect the phase difference.

The phase difference detection circuit 1000 includes a delay unit 401, a multiplier 402, a carrier period integration circuit 403, and a subtractor 404. The multiplier (second multiplication means) 402 and the carrier period integration circuit (second carrier period integration means) 403 function in the same manner as in the first embodiment. However, the multiplier 402 differs from a multiplier 105 in that the multiplier 105 receives output produced from an A/D converter 104 and a generated carrier, while the multiplier 402 receives the output produced from the A/D converter 104 and a delay carrier which is obtained by delaying the generated carrier by a given amount of time by the delay unit (delay means) 401. In this embodiment, the subtractor 404 subtracts integration result produced from the carrier period integration circuit 403 obtained in this structure, from integration result output from a carrier period integration circuit 106. The subtraction result indirectly represents a function of the phase difference between the generated carrier and the BPSK modulated signal. With this subtraction result, the phase difference can be corrected in the carrier generation circuit 102.

Figure 5A:
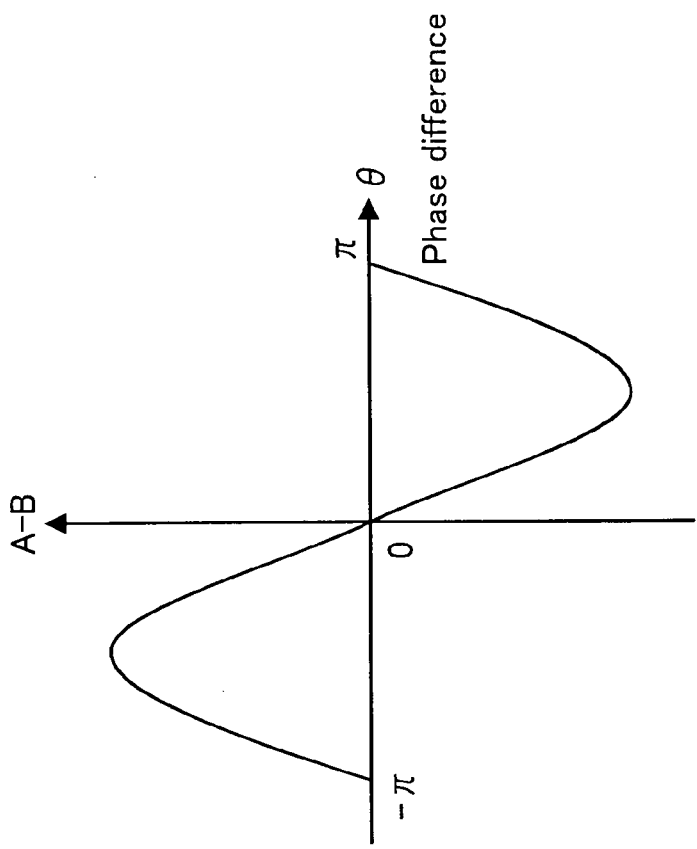
FIG. 5 is a view for explaining phase difference detection.

Hereinafter, the fact that the subtraction result output from the subtractor 404 indirectly represents the phase difference will be discussed with reference to FIG. 5.

Figure 5B:
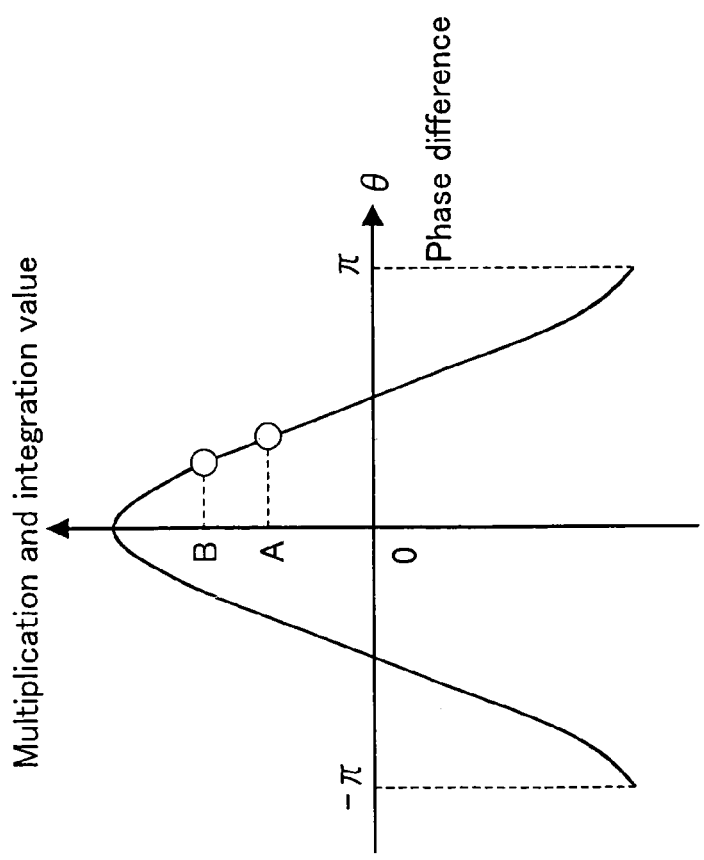

After the multiplication of the generated carrier and the BPSK modulated signal is performed, the multiplication result is integrated with respect to the carrier period. The value resulting from this integration forms a cosine wave with respect to variation in the phase difference between the generated carrier and the BPSK modulated signal. FIG. 5 illustrates this. When there is no phase difference, the value resulting from the integration takes a positive maximum value. When the phase difference is ±π/2, the value is 0; when the phase difference is ±π, which means a reversed phase, the value takes a negative maximum value. It is assumed that a value A is obtained by multiplying the generated carrier that has not passed through the delay unit 401 by the BPSK modulated signal and then integrating the multiplication result with respect to the carrier period, while an integration value B is obtained when the generated carrier that has passed through the delay unit 401 is multiplied by the BPSK modulated signal. As shown in FIG. 5B, the value A−B is negative when the phase difference between the generated carrier and the BPSK modulated signal is positive, while the value A−B is positive, when the phase difference is negative. In other words, based on this relationship, the phase difference can be corrected using the value A−B.

[Third embodiment]

Figure 6:
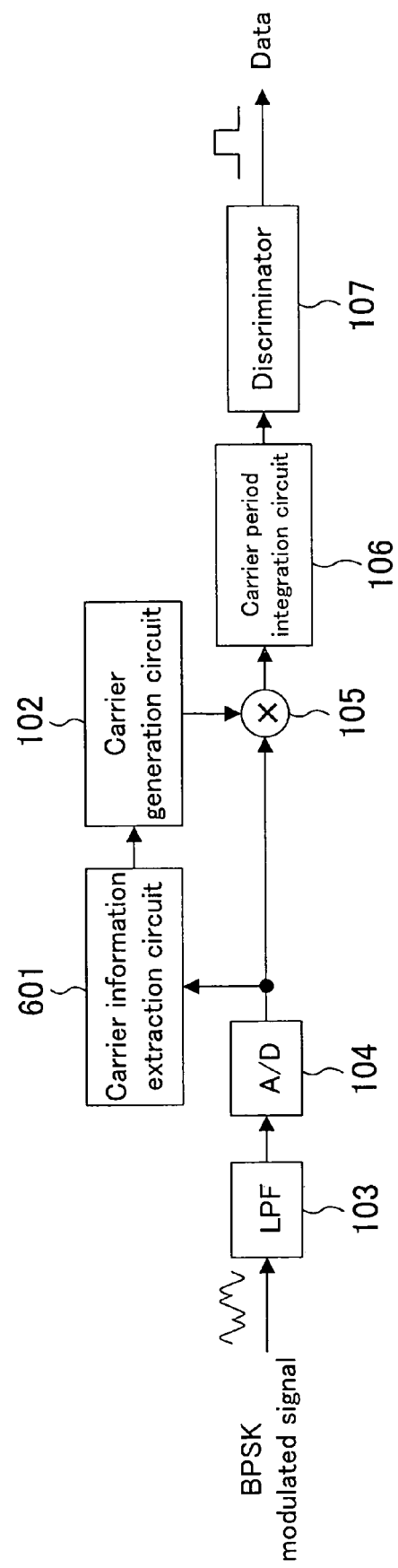
FIG. 6 is a view illustrating the configuration of a BPSK demodulation circuit according to a third embodiment of the present invention.
Figure 7:
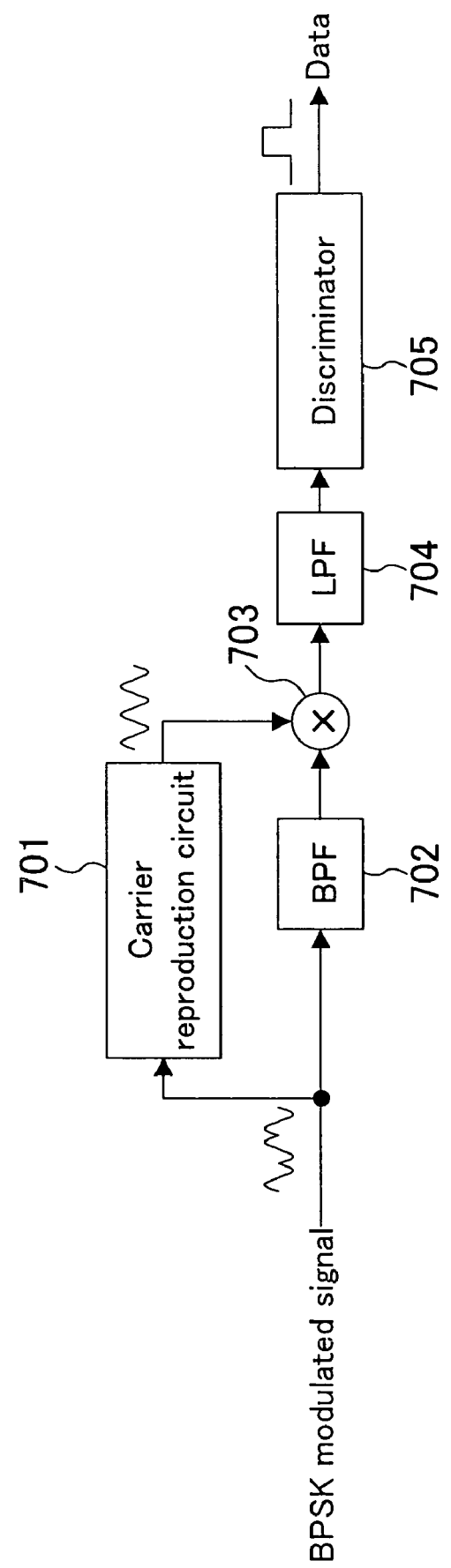
FIG. 7 is a view illustrating a conventional BPSK demodulation circuit.

Next, a third embodiment of the present invention will be described with reference to FIG. 6.

In the first and second embodiments, the analog processing is performed, in which the carrier information is directly extracted from the BPSK modulated signal, that is, the analog BPSK modulated signal is directly input to the carrier information extraction circuit 101. In this embodiment, however, a digitized BPSK modulated signal output from an A/D converter 104 is input to a carrier information extraction circuit 601 so that digital processing is performed. All components of the carrier information extraction circuit 601 are digital circuits. Although not shown, the carrier information extraction circuit 601 includes therein a bandpass filter and a digital PLL circuit. Also, this configuration may include a bandpass filter and a period measuring counter. In this manner, the carrier information extraction circuit 601 is also composed of the digital circuits, whereby performance degradation caused by an analog configuration is reduced in the demodulation circuit, thereby allowing more accurate demodulation.

Also, in this embodiment, a carrier generated by a carrier generation circuit 102 may be a sine wave, a triangular wave, a modified square wave, or a square wave.

As described in the first embodiment, it is also effective in this embodiment that the carrier information extraction circuit 601 is designed so as to output a period itself to facilitate processing performed in the carrier generation circuit 102. Moreover, it will be easily appreciated that the phase difference detection circuit 1000 shown in the second embodiment may be added to the BPSK demodulation circuit of this embodiment.

The invention claimed is:

1. A demodulator comprising:
carrier information extraction means for extracting carrier information from a BPSK modulated signal;
carrier generation means for generating a carrier based on the carrier information extracted by the carrier information extraction means;
analog-to-digital conversion means for converting the BPSK modulated signal to a digital value;
multiplication means for multiplying the carrier output from the carrier generation means by the BPSK modulated signal digitized by the analog-to-digital conversion means;
carrier period integration means for integrating a result of the multiplication performed by the multiplication means, with respect to a period of the carrier generated by the carrier generation means; and
discrimination means for binarizing a result of the integration performed by the carrier period integration means,
wherein at least one of the carrier information extraction means and the carrier generation means is composed of a digital circuit, and
the carrier generation means generates, as the carrier, a modified square wave, in which if the amplitude of the modified square wave is 1 during the period of time in which the phase thereof is from 0 to $\pi/3$, the amplitude becomes 2 during the period of time in which the phase is from $\pi/3$ to $2\pi/3$, the amplitude becomes 1 during the period of time in which the phase is from $2\pi/3$ to $\pi$, the amplitude becomes $-1$ during the period of time in which the phase is from $\pi$ to $4\pi/3$, the amplitude becomes $-2$ during the period of time in which the phase is from $4\pi/3$ to $5\pi/3$, and the amplitude becomes $-1$ during the period of time in which the phase is from $5\pi/3$ to $2\pi$.

2. The demodulator of claim 1, further comprising low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

3. A demodulator comprising:
carrier information extraction means for extracting carrier information from a BPSK modulated signal;
carrier generation means for generating a carrier based on the carrier information extracted by the carrier information extraction means;
analog-to-digital conversion means for converting the BPSK modulated signal to a digital value;
multiplication means for multiplying the carrier output from the carrier generation means by the BPSK modulated signal digitized by the analog-to-digital conversion means;
carrier period integration means for integrating a result of the multiplication performed by the multiplication means, with respect to a period of the carrier generated by the carrier generation means;
discrimination means for binarizing a result of the integration performed by the carrier period integration means, and
phase difference detection means for detecting a value corresponding to a phase difference between the carrier generated by the carrier generation means and the digital BPSK modulated signal converted by the analog-to-digital conversion means,
wherein at least one of the carrier information extraction means and the carrier generation means is composed of a digital circuit,
the phase difference detection means includes:
delay means for delaying the carrier generated by the carrier generation means by a given amount of time;
second multiplication means for multiplying the delay carrier delayed by the delay means by the digital BPSK modulated signal converted by the analog-to-digital conversion means;
second carrier period integration means for integrating a result of the multiplication performed by the second multiplication means, with respect to the period of the carrier generated by the carrier generation means; and
subtraction means for performing a subtraction using the integration result produced by the carrier period integration means and the integration result produced by the second carrier period integration means; and
the carrier generation means receives, as a phase difference detection signal, a result of the subtraction performed by the subtraction means, and adjusts, based on the subtraction result, the phase of the carrier that the carrier generation means generates, so that the phase difference is eliminated.

4. The demodulator of claim 3, further comprising low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

5. A demodulator comprising:
carrier information extraction means for extracting carrier information from a BPSK modulated signal;
carrier generation means for generating a carrier based on the carrier information extracted by the carrier information extraction means;
analog-to-digital conversion means for converting the BPSK modulated signal to a digital value;
multiplication means for multiplying the carrier output from the carrier generation means by the BPSK modulated signal digitized by the analog-to-digital conversion means;

carrier period integration means for integrating a result of the multiplication performed by the multiplication means, with respect to a period of the carrier generated by the carrier generation means; and discrimination means for binarizing a result of the integration performed by the carrier period integration means, wherein at least one of the carrier information extraction means and the carrier generation means is composed of a digital circuit, the carrier information extraction means extracts carrier information of the BPSK modulated signal digitized by the analog-to-digital conversion means, and the carrier generation means generates, as the carrier, a modified square wave, in which if the amplitude of the modified square wave is 1 during the period of time in which the phase thereof is from 0 to $\pi/3$, the amplitude becomes 2 during the period of time in which the phase is from $\pi/3$ to $2\pi/3$, the amplitude becomes 1 during the period of time in which the phase is from $2\pi/3$ to $\pi$, the amplitude becomes −1 during the period of time in which the phase is from $\pi$ to $4\pi/3$, the amplitude becomes −2 during the period of time in which the phase is from $4\pi/3$ to $5\pi/3$, and the amplitude becomes −1 during the period of time in which the phase is from $5\pi/3$ to $2\pi$.

6. The demodulator of claim 5, further comprising low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

7. A demodulator comprising:
carrier information extraction means for extracting carrier information from a BPSK modulated signal;
carrier generation means for generating a carrier based on the carrier information extracted by the carrier information extraction means;
analog-to-digital conversion means for converting the BPSK modulated signal to a digital value;
multiplication means for multiplying the carrier output from the carrier generation means by the BPSK modulated signal digitized by the analog-to-digital conversion means; carrier period integration means for integrating a result of the multiplication performed by the multiplication means, with respect to a period of the carrier generated by the carrier generation means;
discrimination means for binarizing a result of the integration performed by the carrier period integration means, and
phase difference detection means for detecting a value corresponding to a phase difference between the carrier generated by the carrier generation means and the digital BPSK modulated signal converted by the analog-to-digital conversion means,
wherein at least one of the carrier information extraction means and the carrier generation means is composed of a digital circuit, the carrier information extraction means extracts carrier information of the BPSK modulated signal digitized by the analog-to-digital conversion means, the phase difference detection means includes:
delay means for delaying the carrier generated by the carrier generation means by a given amount of time;
second multiplication means for multiplying the delay carrier delayed by the delay means by the digital BPSK modulated signal converted by the analog-to-digital conversion means;
second carrier period integration means for integrating a result of the multiplication performed by the second multiplication means, with respect to the period of the carrier generated by the carrier generation means; and
subtraction means for performing a subtraction using the integration result produced by the carrier period integration means and the integration result produced by the second carrier period integration means; and the carrier generation means receives, as a phase difference detection signal, a result of the subtraction performed by the subtraction means, and adjusts, based on the subtraction result, the phase of the carrier that the carrier generation means generates, so that the phase difference is eliminated.

8. The demodulator of claim 7, further comprising low-frequency-band passing means for receiving the BPSK modulated signal, passing a frequency band of the BPSK modulated signal which is equal to or lower than a carrier frequency band of the BPSK modulated signal, and inputting the passed signal into the analog-to-digital conversion means.

9. An address information extraction device for extracting address information written on a recording medium of an optical disk, the device comprising the demodulator of claim 1,
wherein the demodulator reproduces the address information written on the recording medium.

10. An address information extraction device for extracting address information written on a recording medium of an optical disk, the device comprising the demodulator of claim 3,
wherein the demodulator reproduces the address information written on the recording medium.

11. An address information extraction device for extracting address information written on a recording medium of an optical disk, the device comprising the demodulator of claim 5,
wherein the demodulator reproduces the address information written on the recording medium.

12. An address information extraction device for extracting address information written on a recording medium of an optical disk, the device comprising the demodulator of claim 7,
wherein the demodulator reproduces the address information written on the recording medium.

* * * * *